Patented Dec. 3, 1935

2,022,796

UNITED STATES PATENT OFFICE 2,022,796

PREPARED SULPHUR AND PROCESS

Ferd W. Wieder, Berkeley, Calif., assignor to San Francisco Sulphur Company, a corporation of California No Drawing. Application June 4, 1934, Serial No. 728,955

6 Claims. (Cl. 167—20)

This invention relates to the production of a finely divided sulphur which does not cake or ball even though packaged and stored for a long time, but instead remains free flowing so that it is always ready for use in the various types of dusters and blowers designed for sulphuring vines and other crops.

While various compositions have heretofore been proposed for addition to sulphur to maintain it free flowing, these have generally required the use with sulphur of diluents in such proportions that the percentage of sulphur in the final mass is reduced. I have found that if a relatively small quantity of an oil be added and thoroughly distributed throughout the sulphur while it is in a molten condition, thereafter the sulphur, upon grinding, remains free flowing and does not ball up or cake. While Volck has suggested the incorporation of oil in sulphur in Patent 1,585,058 of May 18, 1926, distribution of the oil was accomplished by grinding the small lump sulphur in the presence of water and with an emulsifying agent.

The oil used is preferably a mineral oil having a flash point above that of the temperature of the molten sulphur. The quantity used can be varied in some measure but an amount of not over one percent by weight usually suffices. Vegetable oils are unsuitable inasmuch as they seem to react with the sulphur undesirably or else be charred by the heat. The range of mineral oils suitable extends from distillates having a flash point of about 300° F. to lubricating stocks and even white oils. While I am not at present certain on the point, it is possible that the sulphur reacts with the oil to a degree to produce a material having different properties, which material is of such a nature that its presence in the sulphur in even a small percentage results in a constantly free flowing material.

In practice I have proceeded as follows:

100 pounds of crude sulphur were heated to about 275° F. to effect a primary refining after which a half pound of a mineral oil, a white oil, was added while the sulphur was thoroughly stirred. The mass was then permitted to cool. Thereafter the sulphur was reduced to a powdered form, usually so fine that a large percentage would pass a 200 mesh screen.

The ground sulphur remained free flowing even though exposed to the atmosphere and moisture for months.

100 pounds of a sublimed sulphur were heated to 260° F. together with three-fourths of a pound of a light lubricating oil. The molten mass was stirred so that it was uniform. The mass was then allowed to solidify. Thereafter, when desired, the mass was comminuted to a size desired, usually 90% through a 300 mesh screen.

This dry mixture likewise remained free flowing even though stored under conditions favorable to caking and balling.

The above examples are set forth by way of example and not by way of limiting the invention.

It is to be noted that the product is usually over 99% sulphur and, in addition, is not only dry but does not include any diluent which is not insecticidally active. Oils of the type incorporated are useful as insecticides so that the sulphur does not contain any insecticidal inerts. Further, I have found that the addition of the oil, in the manner described, results in greater power of adherence to foliage and in a greater as well as a more uniform deposit weight per unit area sprayed or dusted.

I claim:

1. The process of making a free flowing powdered sulphur which comprises melting the sulphur, then incorporating a mineral oil in the molten sulphur, then cooling the sulphur and grinding the sulphur.

2. The process of making a free flowing powdered sulphur which comprises forming a uniform molten sulphur and oil mass, thereafter cooling the mass and comminuting the cooled mass.

3. A substantially pure and dry sulphur, free flowing and non-balling, and containing as the only added diluent an oil initially of insecticidal value, said oil being incorporated in said sulphur when said sulphur was molten.

4. A substantially pure and dry sulphur, free flowing and non-balling, and containing as the only added diluent an oil initially of insecticidal value, said oil being incorporated in less than one percent by weight in said sulphur when said sulphur was molten.

5. The method of making a powdered, dry and free flowing sulphur of over 99% purity which comprises melting sulphur and adding thereto less than a percent by weight of a mineral oil, forming a uniform molten mass of said sulphur and oil, thereafter permitting the mass to solidify, and then grinding the solidified mass.

6. The method of making a powdered, dry and free flowing sulphur of over 99% purity which comprises heating a mass containing about 99% sulphur and 1% of an oil to about 275° F., permitting the heated mass to cool and then comminuting said mass.

FERD W. WIEDER.